United States Patent Office 3,304,991
Patented Feb. 21, 1967

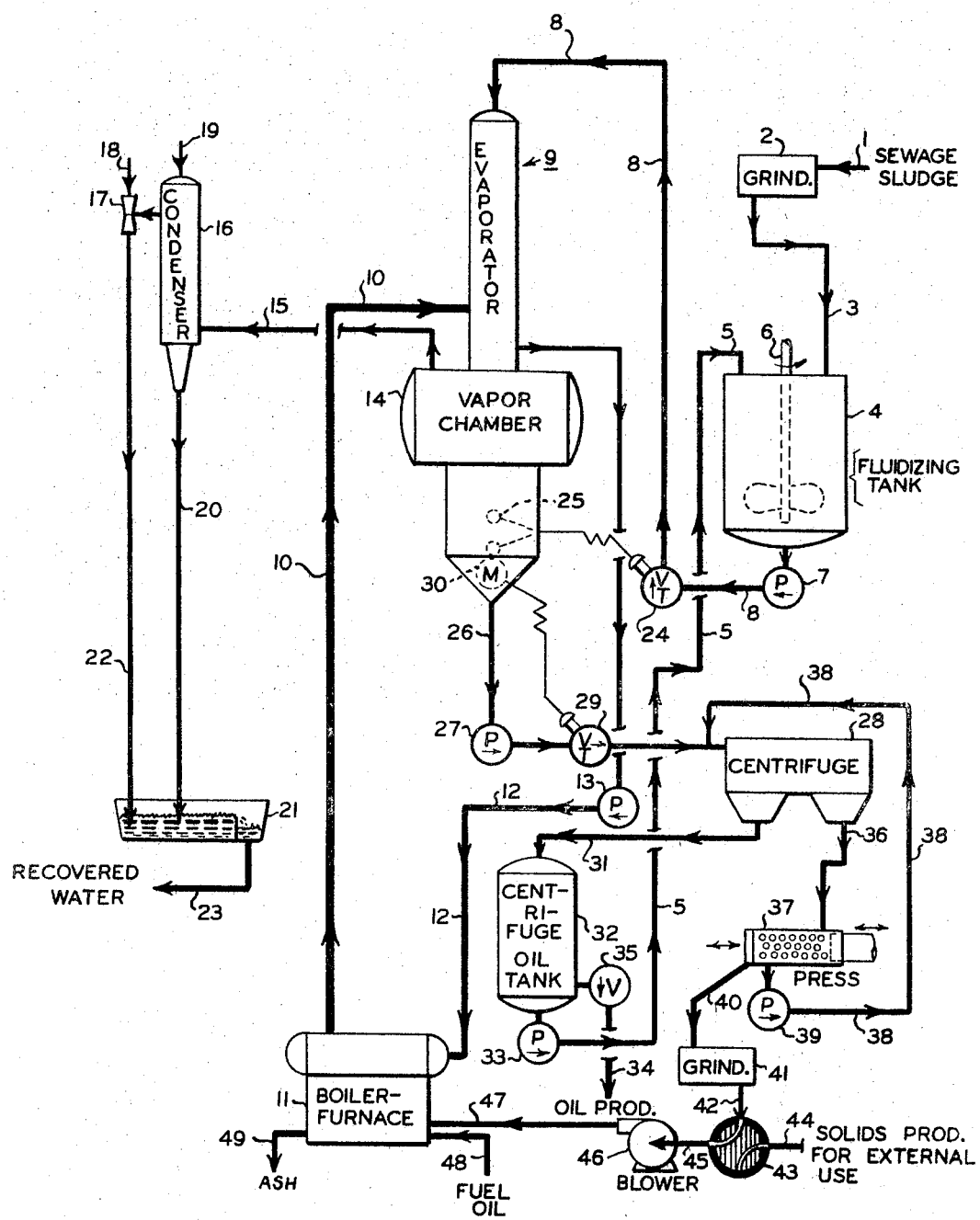

3,304,991
APPARATUS AND PROCESS FOR DEHYDRATING WASTE SOLIDS CONCENTRATES
Charles Greenfield, 35 Walnut St., Murray Hill, N.J. 07971
Filed Feb. 17, 1966, Ser. No. 528,258
10 Claims. (Cl. 159—13)

The present application is a continuation-in-part of co-pending application Serial No. 311,792 filed in the United States Patent Office on September 26, 1963, and now United States Patent No. 3,251,398, issued May 17, 1966.

This invention relates to an improved apparatus and process for dehydrating waste solids concentrates, especially sewage sludge. More particularly it relates to an apparatus and process wherein and whereby an oil-admixed waste solids concentrate is subjected to one heat evaporation step for the removal of its water content essentially completely. Still more particularly the invention relates to an apparatus and process of the kind described in and by which after the step of evaporative dehydration the waste solids concentrate is subjected to mechanical action for the removal of a substantial amount of the admixed oil therefrom. It relates even still more particularly to an apparatus and process of this kind in and by which the free oil generated in the deoiling step is recirculated for mixing with incoming waste solids concentrate to keep the concentrate, or solids content thereof, fluid and pumpable after removal of its water content, and the waste solids generated in the deoiling step are burnable as fuel to generate steam for the evaporative step. Further, the invention relates yet even still more particularly to such an apparatus and process which are self-sustaining with respect to the generation of oil, for example, sewage oil, for fluidity and pumpability maintenance and at least partly self-sustaining with respect to generation of waste solids for boiler fuel for evaporator steam generation. In some cases, to be sure, it may be more attractive economically to sell these solids for fertilizer rather than burn them as fuel.

The economic disposal of waste solids concentrates, especially sewage sludge, is a recognized problem. Ideally, waste solids concentrate disposal apparatuses and processes should provide ease of disposition, avoidance of pollution, economic operation, and hygienic handling. This is true particularly when the concentrate is sewage sludge. Furthermore, in the course of effecting disposal it is desirable to be able to obtain products which are either valuable in themselves or can be utilized to further the economics of the process.

In the customary processing known to the prior art, raw sewage is first treated by settling, aeration, and chemicals to generate a stream of water sufficently clean to be discharged to a region of ultimate disposal such as a natural stream or a river, and a stream of quite watery sewage sludge which is discharged to a closed tank called a digester. The digester is of sufficient volume that sewage sludge which it receives may have a dwell-time in it of thirty days or longer. Heating means such as hot water coils are provided in the digester, and the sludge is maintained at an elevated temperature to provide anaerobic bacterial digestion of the organic constituents which break down the solids in part into gaseous material. The gaseous material may have a substantial content of methane and thus be drawn off continuously to be burned as a fuel for heating the water circulated through the digester coils. Sewage solids in a stream which may have a water content of about 95 percent are drawn off from the digester and spread out in large drying beds for final evaporative drying. The resulting dry solids may be incinerated or disposed of to farms for fertilizer and other possible uses.

The apparatus and process of this invention comprise a systematic arrangement of equipment and a series of steps for treating waste solids concentrates, and particularly for treating sewage sludge as this sludge is in condition to be received in a digester according to prior art techniques. Thus the process and apparatus of the present invention do not replace the aforementioned settling, aeration, and chemical treatment steps applied to raw sewage, nor the apparatus for carrying them out, but do replace all traditional subsequent apparatus for and steps of sludge and solids treatment in a digester and drying beds, and in replacing this apparatus and these steps accomplish all of their purposes.

The present invention provides an improved apparatus and process for accomplishing these purposes in at least that the equipment needed to achieve them is far more compact and appreciably less expensive than the digestion equipment and drying bed area and installations, particularly where drying beds are enclosed by greenhouse-like structures for odor control and year-round utilization, and in at least further that the process steps are capable by themselves of effecting an essentially complete disposal of all of the constituents or components of sewage sludge, both solid and liquid, if disposal to this extent be desired.

The waste solids concentrate dehydration process of this invention as applied to the treatment of sewage sludge comprises the steps of admixing sewage sludge with an oil to obtain a mixture which will remain fluid and pumpable even after the removal of essentially its entire water content; subjecting the resulting mixture of sewage solids, water, and oil to one dehydration step by heat evaporation, and withdrawing a resultant substantially anhydrous slurry of sewage sludge, or sewage solids, and oil. Thereafter, mechanical pressure of either a static or dynamic variety or both is exerted upon this anhydrous slurry to express the substantially greater part of its oil content to leave the sewage solids in a largely dry and oil-free or fat-free condition. Initially the solids particle size should not be in excess of ¼ inch, and a grinding step may be necessary for particle size reduction to make sure that the later formed mixture or slurry of sewage sludge and oil will flow through pipelines and pipe fittings without impediment.

Sewage sludge itself usually contains an appreciable amount of oil independently of oil which may be added to it in the aforementioned mixing step. This oil will be carried through the dehydration step along with the sewage solids and the added oil, and be subjected to being pressed out of the dehydrated slurry along with the added oil. If the dry or substantially water-free slurry is pressed sufficiently vigorously it can thus be made to yield oil in a quantity or at a rate equal to or in excess of that in or at which oil was previously added to the sewage sludge in the mixing step. Generally it is desirable that the pressing step yield enough oil for the mixing step that the process will be self-sufficient in respect of oil requirements. More desirably in most cases the pressing step will provide somewhat more oil than is needed for the mixing or pumpability maintenance step so that the process will provide a net oil yield or product.

The dry sewage solids left after the pressing operation can be utilized as fertilizer or possibly as animal feed or other purposes outside the process itself, and thus constitute a process product. Further, being burnable, they can be used as fuel for the generation of steam needed to run the evaporator component of the apparatus for the dehydration step or steps, and also the steam needed to run auxiliary equipment such as pumps, either directly if they be steam-driven pumps or indirectly if they be motor-driven pumps and the steam is used to run a turbogenerator directly. The process can thus be at least partly self-sufficient in respect of fuel requirements. With sewage oil being cycled back for the mixing step; sewage solids being burned for process fuel, and water evaporated from the sewage sludge being discharged after condensation at sufficient purity to enter a natural stream or river, the apparatus and process of this invention thus provide useful, compact, and complete disposal of all of the components of sewage sludge except to the extent that some net quantities of commercially useful products such as dry sewage solids and sewage or sewage-like oil may be generated, and further that there may be some disposable ash left after the burning of pressed sewage solids for steam generation purposes.

On the basis of analyses of sewage sludge within the normal experience of the prior art, the material or concentrate to be treated by the process of the present invention may be expected to comprise non-fat solids in an amount of about 2 to 40 or more weight percent, usually 3 to 30 weight percent; fat or oil content in an amount of about 0.3 to 15 weight percent or higher; with the remainder being predominantly water. The solids particle size should be a maximum of about ¼ inch as aforesaid, which encompasses the normal distribution of sewage sludge. Larger particles such as from garbage can be ground to size or comminuted by existing techniques, making the process of this invention applicable to garbage under the general term "sewage." Under this same term, the inventive apparatus and process may be used also for the treatment of plant wastes.

The oils which are utilized for admixture with the sewage sludge are inert, relatively non-volatile oils or fats, or other oil-like materials. Typical of these are tallow, other animal fats, and vegetable oils all of which often can be derived directly from the process operation; fatty acids; petroleum oils and their fractions and derivatives including fuel oils; glycerines, glycols, and mixtures thereof, and miscellaneous liquid wastes from industrial plants, generally wastes of an organic nature. It is desirable to employ an oil that imparts process credits, i.e., one that can add value to the sewage product, such as waste oils normally found in sewage or industrial waste, or fuel oils, or, as suggested above, utilize oils derived in the practice of the process itself so as to minimize cost factors. The quantity of oil is such that its ratio in the system is in the range of about 2 to 20 parts by weight, based on the non-fat solids. This refers to total oil, i.e., that added plus that derived from the process for reuse. This amount of oil gives a fluid pumpable mixture even in the absence of sewage water, indeed a mixture of even improved fluidity and pumpability. The term "fluid" as used here is intended to be synonymous with "liquid," i.e., taking the shape of the container to the extent that the mixture fills its container. This will thus also include heavy, viscous fluids which are pumpable but still suitable for heat transfer purposes.

Equipment that can be employed for carrying out the dehydration step of the process of this invention includes single stage or single effect evaporators known in the art, e.g., Mojonnier, Bufflovak, Rodney-Hunt, etc. Functionally the evaporator equipment may be of the forced circulation, flash, falling film, single pass, rotary wiped film, or indeed any suitable type. The temperatures, pressures, and to some extent the concentrations obtaining and achieved in the dehydration step are largely empiric in nature, depending upon the systems and oils being traced. Normal processing temperatures of an oil and waste solids concentrates mixture may indeed fall anywhere in the range about 100° F. to 400° F. with steam supplied to the evaporator at appropriately higher temperatures. Precise rehydration temperatures for any particular wet slurry or mixture will be functions of the desired quality of the end product and economics of fuel utilization, cooling water availability, capital investment, etc. Pressures are not critical and are controlled with temperatures to achieve desired evaporation rates in a given design. In particular, evaporator pressure may be either substantially equal to atmosphere pressure or range upward to a pressure significantly above atmospheric or downward to one appreciably below atmospheric within the contemplation of the present invention.

By way of definition, with regard to evaporators in which fluid mixtures may be dehydrated in a plurality of sequential steps as well as those in which all dehydration takes place in a single step, the expression "first stage" refers to that part of the evaporator equipment in which the hydrated mixture or wet slurry is subjected to the step of the aforesaid sequential plurality of dehydration steps, two or three or more corresponding to "first stage," "second stage," "third stage," etc. The expression "effect," on the other hand, as in "multiple effect," "first effect," "second effect," etc., is related to the flow and action of the heating steam in the evaporator equipment. Where the flow of the wet slurry being progressively heated and dried is countercurrent to that of the heating steam from stage to stage or effect to effect, the operation particularly illustrated and described in said co-pending application Serial No. 311,792 and representing a case of "backward flow," the first stage of a multi-stage or multiple effect evaporator is the same as its last effect. Conversely, where the flow of wet slurry is concurrent with that of the heating steam from stage to stage or effect to effect, the case of "forward flow," the first stage and first effect are the same as indeed they are in a single-stage or single-effect evaporator as used in the present invention. It is not especially meaningful to describe a single-stage or single-effect evaporator as operating in either backward flow or forward flow.

In the operation of a single-stage or single-effect evaporator, about 1½ lbs. of steam will be required for each pound of water evaporated. Normally where sewage sludge is the material being treated according to the process of this invention it is not to be expected that the aggregate heating value of the recovered sewage solids used as fuel will be sufficient to generate all of the steam required by the process carried out continuously. On the other hand, this same process can be utilized for producing and handling solids products from other materials which are found in water solution or dispersion such as powdered coal, cement, spent lime, slimes, black liquor from the paper industry, etc., that is, materials which as found in that condition may reasonably be designated waste solids concentrates, and which further in that condition may be admixed with an oil to form a slurry.

The degree of initial solids concentration in the water solution or dispersion and the heating or calorific value of the solids will vary from case to case, and it is not unreasonable to expect that in some cases the aggregate heating value of the recovered solids used as fuel will be sufficient to generate all of the steam required for a continuous dehydrating operation. Of course, some concentrates amenable to treatment by the process of the present invention will not yield a solids product which has any significant heating or fuel value. A water solution of cement would be an example of this. In such a case the process would be carried out essentially entirely to recover the solids for external use, together with purification of the water in which they were dispersed or dissolved.

In comparison with the multi-effect evaporator process described in co-pending application Serial No. 311,792, the process of the present invention is generally at a disadvantage with respect to fuel consumption whether or not in any given case the process is capable of generating some or even all of its own fuel. The outstanding advantages of the process and apparatus of the present invention compared with that particularly illustrated, described, and claimed in the aforesaid application are their comparative simplicity which makes for low first cost of installation and their amenability to reduction to small scale or "package" installation and operation in cases where lack of complication and small space requirements for equipment may be more important for the sake of convenience and indeed of more economic benefit than the lower fuel requirement of a multi-effect evaporator installation.

The nature and substance of the present invention as well as its objects and advantages will be more clearly perceived and fully understood by referring to the following description and claims taken in connection with the accompanying drawing of the invention applied to the treatment of sewage sludge.

Referring particularly to the flow diagram which the drawing comprises, sewage sludge enters grinder or comminutor 2 through line 1. According to samples taken at Hershey, Pennsylvania, this sludge may typically comprise 7.2 weight percent solids and fats, and 92.8 weight percent water. Of the 7.2% solids, 1% is fat and the other is non-fat solids. From comminutor 2 the sludge containing solid particles of only a limited maximum size of about ¼ inch flows into fluidizing tank 4 through line 3. About 50 parts of hot oil or fat are added through line 5 to tank 4 to maintain a pumpable fluid sludge or sewage solids system or mixture even after the evaporation of the water content therefrom. The system is mixed and agitated in fluidizing tank 4 by means of stirring device 6, and then withdrawn from the tank by means of pump 7.

The pump delivers the mixture of sewage sludge and tallow or admixed oil or fat through line 8 to the top of a single stage or single effect evaporator 9 which may be of the falling film type, for example, and which is supplied with steam through line 10 from boiler furnace 11. This steam may have a temperature in the range 240° F. to 270° F. After the steam has been condensed to water, it leaves the evaporator through line 12 to return to the boiler furnace, being picked up and driven by boiler feed pump 13. Within the evaporator water is boiled off of the sludge and tallow mixture at a pressure which may be in the range 4 in. Hg Abs. to 12 in. Hg Abs. The water from the mixture in the form of superheated vapor leaves vapor chamber 14 of the evaporator through line 15 and flows into barometric condenser 16 within which a vacuum is maintained by means of ejector 17 supplied with steam through line 18.

Superheated vapor entering condenser 16 through line 15 is mixed with and condensed by cooling water entering the condenser through line 19, and the resulting stream of rather warm water is discharged through line 20 into hot well 21. The hot well also receives the steam and non-condensable gases leaving ejector 17 through line 22, and the water in the well serves to condense this steam with the non-condensables escaping at and from the water surface. From the hot well itself water is drawn off continuously through line 23, and may be reused through the sewage treatment plant. In an alternate arrangement, the steam and non-condensables leaving ejector 17 could be sent to the fuel oil nozzles or firing apparatus of boiler furnace 11 and used to atomize the liquid fuel. The non-condensables, often odoriferous and being at least partly of a flammable nature, would themselves provide heating value as they participated in the furnace combustion.

Flow of the wet slurry or mixture of sewage sludge and oil to the evaporator is controlled directly by throttle valve 24 in line 8 on the discharge side of pump 7. The opening of this valve is controlled in turn by liquid level sensing device 25 in the sump of the evaporator, this device sensing the level of the surface if the essentially fully dehydrated slurry or mixture of sewage solids and oil therein. An excessively high level causes the valve to close at least part way with consequent reduction in flow of wet slurry to the evaporator, while an excessively low level causes the valve to open wider with consequent increase in flow.

Dry slurry is withdrawn continuously from the bottom of the evaporator through line 26 by means of pump 27, and is discharged thereby to centrifuge 28. Flow of the dry slurry or mixture of sewage solids, oil, and trace quantities of water to the centrifuge is controlled directly by throttle valve 29 in line 26 on the discharge side of pump 27. The opening of this valve is controlled in turn by moisture sensing device 30 in the sump of the evaporator. At least an excessively high moisture content of the slurry in the evaporator sump causes this valve to close part way with consequent reduction in flow of dry or dehydrated slurry from the evaporator. Normal composition of dry slurry leaving the evaporator through line 26 would be about 1% water, approximately 15% non-fat solids, and the remainder liquid fat or oil.

Centrifuge 28 separates the dehydrated sewage sludge and oil slurry into two streams. One of these streams, a stream of relatively clear oil, is discharged and delivered through line 31 to centrifuge oil tank 32. This oil is recycled or circulated back from tank 32 to fluidizing tank 4 through line 5 by means of pump 33. Should the system generate oil in excess of that needed for fluidizing purposes, this excess or net product oil may be withdrawn from tank 32 through line 34 provided with stop valve 35. The other stream from the centrifuge, a stream containing substantially all of the sewage solids but which is still about 30% to 40% oil by weight, is discharged and delivered through line 36 to a mechanical pressing apparatus 37 of a kind constructed and configured to effect substantial separation of the liquid and solid components of a liquids-solids mixture.

In the drawing, pressing apparatus 37 is suggestively in the nature of a reciprocating press or liquid-solid separator, for example, a piston-type, perforated barrel or curb or cage press such as that disclosed in United States Patent No. 1,135,309 issued to E. T. Meakin on April 13, 1915. It may indeed be a press of this nature, but it may also be a press of any other suitable kind. In the general sense, of course, centrifuge 28 itself may be regarded as a liquid-solid separating press, one in which pressures or separating forces are generated dynamically rather than statically. It is within the contemplation of the present invention that certain waste solids concentrates amenable to processing in accordance with it will yield dry slurries at the evaporator sump discharge which can be separated economically and adequately into their non-fat solids and liquid oil components by means of a single piece of mechanical equipment only, that is, for example, by either a centrifuge alone or a perforated barrel press alone.

Two streams of material leave press 37, possibly intermittently depending upon the nature of the press. One of these, a stream of oil withdrawn from the press through line 38 by means of pump 39, represents the oil pressed out of the stream of essentially water-free but still oil-containing material delivered to the press through line 36 from centrifuge 28. As shown, line 38 connects into line 26 so that oil flowing through line 38 mixes with and further fluidizes the dry slurry of oil and sewage solids flowing from the evaporator to the centrifuge. This is not the only way in which oil from the press can be handled. Such oil may, for instance, be sent directly to centrifuge oil tank 32 for prompt recycling to fluidizing tank 4.

Assuming that the sewage sludge is originally oil-containing, the vigor of the operation performed in and by press 37 will determine whether or not the system generates a net oil product which can be withdrawn through line 34 or otherwise. Pressing down to just a "break even" level of residual oil in the sewage solids will allow the system to function without the addition of any oil or fat except the quantity needed for start-up purposes, but also without the possibility of generating any net oil product. Pressing to a level higher than the "break even" level, that is, a level at which there is more residual oil in the pressed sewage solids than there was oil originally associated with these solids in the sewage sludge flowing into the system through line 1, will not only eliminate the possibility of a net oil product, but also require that the system be supplied continuously with oil or fat for make-up purposes.

The other stream of material leaving press 37, a stream of pressed, dry sewage solids withdrawn from the press through or along line or conveyor track 40 is delivered to grinder or communitor 41. These solids, in cake or chunk form upon ejection from press 37, will contain some oil or fat, but desirably no more than about 20% by weight, and most desirably fat in the amount less than 15% by weight. By means of grinder 41 the pressed solids are reduced to granular if not powder form, and from the grinder they flow through line 42 to a rotary selector valve 43 by which they may be directed to either line 44 or line 45. Line 44 leads to collecting or bagging equipment, and through it the solids may be withdrawn for later use as fertilizer or other employment outside the illustrated system. Line 45, shown as active according to the setting of valve 43, leads to the suction of a blower 46, and this blower discharges the comminuted sewage solids as fuel to the combustion region of boiler-furnace 11 through line 47.

When the process of this invention is used for the treatment of sewage sludge it is not expected, as noted earlier, that it will be able to generate combustible solids at a rate sufficient to meet all fuel requirements for steam generation. Accordingly, supplemental fuel in the form of fuel oil or any other suitable material is fed to boiler-furnace 11 through line 48. Of course when the sewage solids are drawn off as a process product through line 44 all of the fuel for firing the boiler furnace must be provided through line 48. To the extent that the sewage solids are burned as fuel, some residual ash or non-combustible mineral matter will remain after these solids have been fired. This ash may be recovered by means of proper cyclones and dust collectors, and its removal from the boiler furnace is indicated by way of line 49. Being rich in minerals, this ash may itself be quite valuable as a fertilizer. This is true because although furnace combustion temperatures are in the range about 1,600° F. to 1,800° F. which insures organic material or odor destruction, the exit stack gas temperatures are below 450° F. on account of the high efficiency of heat transfer from the furnace gases to and through the boiler steaming surfaces. The low exit temperatures result in entry into the atmosphere of only a minimum of volatile ash constituents such as the valuable phosphorous pentoxide component.

Protection by Letters Patent of this invention in all its aspects as the same are set forth in the appended claims is sought to the broadest extent that the prior art allows.

What is claimed is:

1. An apparatus for dehydrating liquiform waste solids concentrates, said apparatus comprising (1) a tank adapted to receive a stream of such a waste solids concentrate and a stream of oil and wherein a mixing of these streams may be effected, (2) a single effect evaporator, (3) a conduit extending from said tank to said evaporator wherethrough a mixture of waste solids concentrate and oil may flow from said tank into the evaporating region of said evaporator, (4) a combustion apparatus associated with said evaporator for supplying evaporative heat thereto, (5) pressing apparatus adapted to effect a separation of liquid-solid mixtures into their respective liquid and solid components, (6) a conduit extending from said evaporator to said pressing apparatus wherethrough a substantially anhydrous mixture of waste solids and oil may flow from said evaporator to said pressing apparatus, and (7) means for discharging separated waste solids from said pressing apparatus to said combustion apparatus, said combustion apparatus being adapted to receive said solids and burn the same as fuel to provide at least part of the evaporative heat required by said evaporator.

2. An apparatus for dehydrating liquiform waste solids concentrates according to claim 1 in which said combustion apparatus associated with said single effect evaporator comprises (i) a boiler-furnace for the generation of steam and (ii) a conduit extending from said boiler-furnace to said evaporator wherethrough steam may flow from said boiler-furnace to said evaporator.

3. An apparatus for dehydrating liquiform waste solids concentrates according to claim 1 which further comprises condensing apparatus and a conduit extending from said single effect evaporator to said condensing apparatus wherethrough water driven off as vapor from said mixture of waste solids concentrate and oil in said evaporator may flow from said evaporator to said condensing apparatus to be recondensed to liquid water therein.

4. An apparatus for dehydrating liquiform waste solids concentrates according to claim 1 which further comprises a conduit extending from said pressing apparatus to said tank wherethrough separated liquid oil from said pressing apparatus may flow to said tank to be mixed therein with said waste solids concentrate.

5. A process for dehydrating liquiform waste solids concentrates which comprises the steps of (1) admixing such a waste solids concentrate with a relatively non-volatile oil to obtain a mixture which will remain fluid and pumpable after the removal of the water content therefrom; (2) subjecting the resultant oil-containing mixture to a single dehydration step by heat evaporation, and (3) withdrawing a substantially anhydrous waste solids concentrate and oil slurry.

6. A process for dehydrating liquiform waste solids concentrates according to claim 5 in which a processing temperature of the oil and waste solids concentrate mixture in the range about 100° F. to 400° F. is utilized in the dehydration step.

7. A process for dehydrating liquiform waste solids concentrates according to claim 5 which further comprises the step of recovering the water content of said waste solids concentrate by gathering and condensing the vapor driven off from said mixture of waste solids concentrate and oil in the course of said evaporative dehydration step.

8. A process for dehydrating liquiform waste solids concentrates according to claim 5 which further comprises the step of separating oil from the anhydrous waste solids concentrate and oil slurry to give a substantially oil-free waste solids product.

9. A process for dehydrating liquiform waste solids concentrates according to claim 8 which further comprises the step of recycling separated oil to the waste solids concentrate and oil admixing step.

10. A process for dehydrating liquiform waste solids concentrates according to claim 8 which further comprises the step of utilizing recovered waste solids product as fuel for supplying heat for said dehydration step by heat evaporation therefor.

References Cited by the Examiner

UNITED STATES PATENTS

| | | | |
|---|---|---|---|
| 578,512 | 3/1897 | Hogel | 23—259.3 |
| 600,597 | 3/1898 | Rissmuller | 23—259.3 |
| 1,259,248 | 3/1918 | Lammevtz | 23—259.3 |
| 2,151,079 | 3/1939 | Bowen | 210—2 |
| 2,182,428 | 12/1939 | Fladmark | 159—48 |
| 2,755,293 | 7/1956 | McDonald | 210—10 X |
| 2,888,449 | 5/1959 | Borck | 159—17 X |

NORMAN YUDKOFF, *Primary Examiner.*

J. SOFER, *Assistant Examiner.*